United States Patent
Idicheria et al.

(10) Patent No.: US 9,970,407 B2
(45) Date of Patent: May 15, 2018

(54) METHOD AND APPARATUS FOR CONTROLLING OPERATION OF AN INTERNAL COMBUSTION ENGINE

(71) Applicant: GM GLOBAL TECHNOLOGY OPERATIONS LLC, Detroit, MI (US)

(72) Inventors: Cherian A. Idicheria, Novi, MI (US); Gerald A. Silvas, Columbus, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 196 days.

(21) Appl. No.: 14/831,912

(22) Filed: Aug. 21, 2015

(65) Prior Publication Data

US 2016/0069320 A1     Mar. 10, 2016

Related U.S. Application Data

(60) Provisional application No. 62/047,261, filed on Sep. 8, 2014.

(51) Int. Cl.
*F02P 9/00* (2006.01)
*H01T 13/50* (2006.01)
(Continued)

(52) U.S. Cl.
CPC .......... *F02P 23/04* (2013.01); *F02D 13/0261* (2013.01); *F02D 37/02* (2013.01); *F02D 41/0002* (2013.01); *F02D 41/3017* (2013.01); *F02D 41/3041* (2013.01); *F02D 41/3047* (2013.01); *F02D 41/402* (2013.01); *F02P 5/045* (2013.01); *F02P 9/007* (2013.01); *H01T 13/50* (2013.01); *H01T 19/02* (2013.01);
(Continued)

(58) Field of Classification Search
CPC ............. F02D 41/3023; F02D 41/3029; F02D 41/3035; F02D 41/3041; F02D 41/3047; F02P 9/002; F02P 9/007; F02P 15/10; F02P 23/00; F02P 23/04; F02P 23/05; H01T 13/50; H01T 19/00; H01T 19/02
USPC ...................... 123/143 B, 295, 299
See application file for complete search history.

(56) References Cited

U.S. PATENT DOCUMENTS 5,469,013 A * 11/1995 Kang ...................... H01T 13/50
313/128
6,176,215 B1   1/2001 Baur et al.
(Continued)

FOREIGN PATENT DOCUMENTS

CN      103201503 A      7/2013
JP      2009121406      *  4/2009   .............. F02P 23/04
(Continued)

*Primary Examiner* — Erick Solis
(74) *Attorney, Agent, or Firm* — Quinn IP Law

(57) ABSTRACT

An internal combustion engine includes a plasma ignition system having an in-cylinder dielectric barrier-discharge igniter, and a direct-injection fuel injector having an in-cylinder fuel nozzle. The fuel nozzle protrudes into the combustion chamber proximal to the igniter. A controller operatively connects to the internal combustion engine, the plasma ignition system and the fuel injection system. The controller controls the internal combustion engine at an air/fuel ratio that is lean of stoichiometry. The fuel injector injects a first fuel pulse prior to activation of the igniter, and then the igniter initiates a plasma energy pulse. The fuel injector is controlled to inject a second fuel pulse during the plasma energy pulse.

11 Claims, 5 Drawing Sheets

(51) Int. Cl.
*H01T 19/02* (2006.01)
*F02P 23/04* (2006.01)
*F02D 41/30* (2006.01)
*F02D 13/02* (2006.01)
*F02D 41/40* (2006.01)
*F02D 37/02* (2006.01)
*F02D 41/00* (2006.01)
*F02P 5/04* (2006.01)
F02D 41/38 (2006.01)
F02M 61/18 (2006.01)
H05H 1/24 (2006.01)

(52) U.S. Cl.
CPC ......... *F02D 41/009* (2013.01); *F02D 41/403* (2013.01); *F02D 2041/001* (2013.01); *F02D 2041/389* (2013.01); *F02M 61/1806* (2013.01); *H05H 2001/245* (2013.01); *H05H 2001/2412* (2013.01); *H05H 2001/2431* (2013.01); *Y02T 10/128* (2013.01); *Y02T 10/18* (2013.01); *Y02T 10/42* (2013.01); *Y02T 10/44* (2013.01)

(56) References Cited

U.S. PATENT DOCUMENTS

| | | | | |
|---|---|---|---|---|
| 7,644,698 | B2* | 1/2010 | Shiraishi | F01L 13/0026 123/146.5 R |
| 9,010,293 | B2* | 4/2015 | Blank | F02B 19/10 123/143 B |
| 9,391,431 | B2* | 7/2016 | Okabe | H01T 13/467 |
| 9,546,617 | B2* | 1/2017 | Fujimoto | F02D 41/403 |
| 9,599,058 | B2* | 3/2017 | Harada | F02B 17/005 |
| 2002/0026923 | A1* | 3/2002 | Bertsch | F02M 45/02 123/300 |
| 2005/0092287 | A1* | 5/2005 | Tozzi | F02P 9/007 123/305 |
| 2007/0266979 | A1* | 11/2007 | Nagamine | F02D 41/3041 123/143 B |
| 2008/0141967 | A1* | 6/2008 | Tani | F02P 9/007 123/143 B |
| 2009/0031984 | A1* | 2/2009 | Shiraishi | F02P 9/007 123/260 |
| 2009/0031988 | A1* | 2/2009 | Shiraishi | F01L 13/0026 123/406.19 |
| 2009/0126684 | A1* | 5/2009 | Shiraishi | F02D 41/3041 123/406.12 |
| 2011/0232602 | A1* | 9/2011 | Schenk | F02B 1/12 123/295 |
| 2014/0026848 | A1* | 1/2014 | Abe | F02P 23/045 123/297 |
| 2014/0174416 | A1* | 6/2014 | Okabe | H01T 13/52 123/608 |
| 2014/0216396 | A1* | 8/2014 | Yamashita | F02B 11/00 123/297 |
| 2015/0137677 | A1* | 5/2015 | Sohn | H01T 19/04 313/268 |
| 2015/0275818 | A1* | 10/2015 | Fujimoto | F01N 9/00 60/285 |
| 2015/0322913 | A1* | 11/2015 | Ikeda | F02P 3/01 123/143 B |
| 2015/0377206 | A1* | 12/2015 | Idicheria | F02D 41/402 123/299 |
| 2016/0157332 | A1* | 6/2016 | Ban | H05H 1/52 315/246 |
| 2016/0305393 | A1* | 10/2016 | Idicheria | H01T 13/20 |

FOREIGN PATENT DOCUMENTS

JP 2010037948 A 2/2010
JP 2010216270 A 9/2010

* cited by examiner

US 9,970,407 B2

METHOD AND APPARATUS FOR CONTROLLING OPERATION OF AN INTERNAL COMBUSTION ENGINE

CROSS-REFERENCE TO RELATED APPLICATIONS

This application claims the benefit of U.S. Provisional Application No. 62/047,261, filed Sep. 8, 2014, which is hereby incorporated by reference in its entirety.

TECHNICAL FIELD

This disclosure relates to an internal combustion engine configured with a direct injection fuel system and a barrier-discharge igniter, and control thereof.

BACKGROUND

Known spark-ignition (SI) engines introduce an air/fuel mixture into each cylinder that is compressed during a compression stroke and ignited by a spark plug. Known compression-ignition (CI) engines inject pressurized fuel into a combustion cylinder near top dead center (TDC) of the compression stroke that ignites upon injection. Combustion for both SI engines and CI engines involves premixed or diffusion flames controlled by fluid mechanics.

SI engines may operate in different combustion modes, including a homogeneous SI combustion mode and a stratified-charge SI combustion mode. SI engines may be configured to operate in a homogeneous-charge compression-ignition (HCCI) combustion mode, also referred to as controlled auto-ignition combustion, under predetermined speed/load operating conditions. HCCI combustion is a distributed, flameless, kinetically-controlled auto-ignition combustion process with the engine operating at a dilute air/fuel mixture, i.e., lean of a stoichiometric air/fuel point, with relatively low peak combustion temperatures, resulting in low NOx emissions. An engine operating in the HCCI combustion mode forms a cylinder charge that is preferably homogeneous in composition, temperature, and residual exhaust gases at intake valve closing time. The homogeneous air/fuel mixture minimizes occurrences of rich in-cylinder combustion zones that form smoke and particulate emissions.

Engine airflow may be controlled by selectively adjusting position of the throttle valve and adjusting opening and closing of intake valves and exhaust valves. On engine systems so equipped, opening and closing of the intake valves and exhaust valves may be adjusted using a variable valve actuation system that includes variable cam phasing and a selectable multi-step valve lift, e.g., multiple-step cam lobes that provide two or more valve lift positions. In contrast to the throttle position change, the change in valve position of the multi-step valve lift mechanism is a discrete step change.

SUMMARY

An internal combustion engine includes a plasma ignition system having an in-cylinder dielectric barrier-discharge igniter, and a direct-injection fuel injector having an in-cylinder fuel nozzle. The fuel nozzle protrudes into the combustion chamber proximal to the igniter. A controller operatively connects to the internal combustion engine, the plasma ignition system and the fuel injection system. The controller controls the internal combustion engine to operate at an air/fuel ratio that is lean of stoichiometry. The fuel injector injects a first fuel pulse prior to activation of the igniter, and then the igniter initiates a plasma energy pulse. The fuel injector is controlled to inject a second fuel pulse during the plasma energy pulse.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which:

FIGS. 2-1 and 2-2 each schematically shows an end-view of one embodiment of an igniter of a plasma ignition system, in accordance with the disclosure;

DETAILED DESCRIPTION

Figure 1:
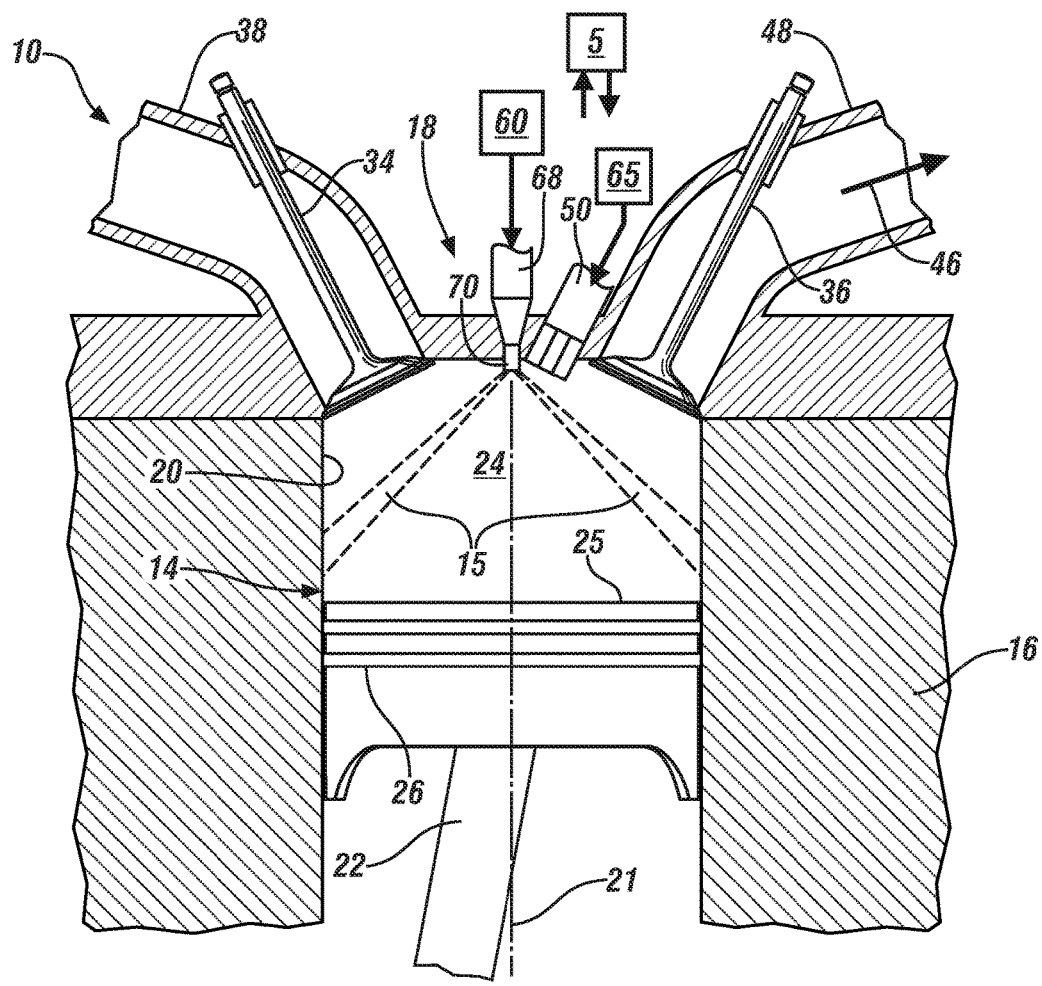
FIG. 1 schematically illustrates a cross-sectional view of a single cylinder for an internal combustion engine including a direct-injection fuel injector proximal to a dielectric barrier-discharge plasma igniter of a plasma ignition system, in accordance with the disclosure.

Referring now to the drawings, wherein the depictions are for the purpose of illustrating certain exemplary embodiments only and not for the purpose of limiting the same, FIG. 1 schematically illustrates a cross-sectional view of a single cylinder 14 for a multi-cylinder internal combustion engine (engine) 10, wherein each of the cylinders includes a variable volume combustion chamber 24 having a direct-injection fuel injector 68 and a proximal dielectric barrier-discharge igniter (igniter) 50 protruding therein. The igniter 50 is an actuator for a plasma ignition system 65. The fuel injector 68 fluidly and operatively couples to a fuel injection system 60. A controller 5 monitors and controls operation of the engine 10, including monitoring and controlling the plasma ignition system 65 and the fuel injection system 60. Like reference numerals refer to like elements throughout the disclosure.

The engine 10 selectively operates in one of a plurality of combustion modes depending upon operating conditions, including a homogeneous-charge compression-ignition (HCCI) combustion mode or a stratified charge combustion mode, both of which include operating at an air/fuel ratio that is primarily lean of stoichiometry, and a spark-ignition (SI) combustion mode, which includes operating at a stoichiometric air/fuel ratio. The disclosure may be applied to various engine systems and combustion cycles. In one embodiment, the engine 10 may be operably connected to a plurality of wheels disposed on one or more axles of a vehicle (not shown) to provide tractive power. For example, the engine 10 may be connected to a transmission (not shown) which may in turn rotate the one or more axles. The engine 10 may provide direct tractive power to the plurality of wheels, such as via the transmission connected to the one or more axles, or may provide power to one or more electric motors (not shown) that may in turn provide direct motive power to the plurality of wheels. In any event, the engine 10 may be configured for providing power to a vehicle by combusting fuel and converting chemical energy to mechanical energy.

The engine 10 includes a cylinder block 16 in which the cylinders 14 are formed, a single one of which is shown. Each cylinder 14 houses a movable piston 26. The walls 20 of the cylinder 14, a top portion 25 of the piston 26 and an inner exposed portion of the cylinder head 18 define outer boundaries of a variable-volume combustion chamber 24 that is disposed therein. Each piston 26 mechanically couples to a connecting rod 22 that rotatably couples to a crankshaft, and the piston 26 slidably translates within the cylinder 14 between a top-dead-center (TDC) position and a bottom-dead-center (BDC) position to transfer power to the crankshaft during combustion events. As shown, the piston 26 is near the BDC position.

The cylinder head 18 provides structure for mounting the fuel injector 68 proximate to the igniter 50 such that portions thereof protrude into the combustion chamber 24. The cylinder head 18 includes an intake port or runner 38 that is in fluid communication with the combustion chamber 24, with an intake valve 34 disposed within for controlling airflow into the combustion chamber 24. The cylinder head 18 also includes an exhaust port or runner 48 that is in fluid communication with the combustion chamber 24, with an exhaust valve 36 disposed within for controlling exhaust gas flow 46 out of the combustion chamber 24. FIG. 1 shows a single intake valve 34 and a single exhaust valve 36 associated with the combustion chamber 24, but it is appreciated that each combustion chamber 24 may be configured with multiple intake valves and/or multiple exhaust valves. Openings and closings of the intake and exhaust valves are effected by urgings of valve springs and lobes on one or more rotating camshafts that are rotatably coupled to the crankshaft, or other suitable mechanisms.

In operation, a controller 5 monitors inputs from engine and vehicle sensors to determine states of engine parameters. The controller 5 is configured to receive operator commands, e.g., via an accelerator pedal and a brake pedal to determine an output torque request, from which engine control parameters and an engine torque command are derived. The controller 5 executes control routines stored therein to determine states for the engine control parameters to control the aforementioned actuators to form a cylinder charge, including controlling throttle position, compressor boost, plasma ignition timing, fuel injection pulsewidth affecting injected fuel mass and timing, EGR valve position to control flow of recirculated exhaust gases, and intake and/or exhaust valve timing and phasing. Valve timing and phasing may include negative valve overlap (NVO) and lift of exhaust valve reopening (in an exhaust re-breathing strategy), and positive valve overlap (PVO). Engine parameters associated with a cylinder charge that are affected by individual engine control parameters include air/fuel ratio, intake oxygen, engine mass airflow (MAF), manifold pressure (MAP) and mass-burn-fraction point (CA50 point). The air/fuel ratio may be controlled by the fuel injection pulsewidth and affects an amount of fuel injected into each combustion chamber 24 during each engine cycle. The engine mass airflow (MAF) and manifold pressure (MAP) are controlled by controlling NVO/PVO, the ETC and a turbocharger (when employed) and affects a magnitude of trapped air mass in the cylinder and a magnitude of residual gases in the combustion chamber 24. The intake oxygen may be controlled by the EGR valve, which controls a magnitude of external EGR during each engine cycle. The engine parameters of MAF, actual air/fuel ratio, intake oxygen, MAP and CA50 point may be directly measured using sensors, inferred from other sensed parameters, estimated, derived from engine models or otherwise dynamically determined by the controller 5.

The terms controller, control module, module, control, control unit, processor and similar terms refer to any one or various combinations of Application Specific Integrated Circuit(s) (ASIC), electronic circuit(s), central processing unit(s), e.g., microprocessor(s) and associated non-transitory memory component in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that can be accessed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean any controller-executable instruction sets including calibrations and look-up tables. Each controller executes control routine(s) to provide desired functions, including monitoring inputs from sensing devices and other networked controllers and executing control and diagnostic instructions to control operation of actuators. Routines may be periodically executed at regular intervals, for example each 100 microseconds during ongoing operation. Alternatively, routines may be executed in response to occurrence of a triggering event. Communications between controllers, and communications between controllers, actuators and/or sensors may be accomplished using a direct wired link, a networked communications bus link, a wireless link or another suitable communications link. Communications includes exchanging data signals in any suitable form, including, for example, electrical signals via a conductive medium, electromagnetic signals via air, optical signals via optical waveguides, and the like. Data signals may include signals representing inputs from sensors, signals representing actuator commands, and communications signals between controllers. The term 'model' refers to a processor-based or processor-executable code and associated calibration that simulates a physical existence of a device or a physical process. As used herein, the terms 'dynamic' and 'dynamically' describe steps or processes that are executed in real-time and are characterized by monitoring or otherwise determining states of parameters, and regularly or periodically updating the states of the parameters during execution of a routine or between iterations of execution of the routine.

The fuel injector 68 includes a flow control valve and a fuel nozzle 70 that directly injects fuel into the combustion chamber 24. The fuel may be any suitable composition such as, but not limited to, gasoline, ethanol, diesel, natural gas, and combinations thereof. The fuel nozzle 70 preferably extends through the cylinder head 18 into the combustion chamber 24. As shown, the cylinder head 18 is arranged with the fuel injector 68 and fuel nozzle 70 in a geometrically central portion of a cylindrical cross-section of the combustion chamber 24 and aligned with a longitudinal axis 21 thereof. The fuel nozzle 70 is shown arranged in line with the igniter 50 between the intake valve 34 and the exhaust valve 36. Alternatively, the cylinder head 18 is arranged with the fuel nozzle 70 in line with the igniter 50 and orthogonal to a line between the intake valve 34 and the exhaust valve 36. Alternatively, the cylinder head 18 is arranged with the fuel nozzle 70 in a side injection configuration. The arrangements of the cylinder head 18 including the fuel nozzle 70 and the igniter 50 described herein are illustrative. Other suitable arrangements may be employed within the scope of this disclosure.

The fuel nozzle 70 includes an end defining one or a plurality of opening(s) (not shown) through which fuel flows into the combustion chamber 24, forming a spray pattern 15 that includes a single one or a plurality of fuel plumes. The shape and penetration of the fuel plume(s) is a result of fuel momentum caused by fuel pressure and the configuration of the fuel nozzle 70, including cross-sectional area, shape and orientation of the opening(s) of the fuel nozzle 70 relative to the combustion chamber 24, and combustion chamber flow dynamics. The combustion chamber flow dynamics may be driven by the shape of the combustion chamber 24, including presence of devices for generating swirl therein, and other factors.

By way of non-limiting examples, when the fuel nozzle 70 includes a single hole device including a pintle and seat with a single circular cross-sectional opening into the combustion chamber 24, the resulting fuel spray pattern 15 may be a single plume having a continuous, generally hollow conical shape. Alternatively, the fuel nozzle 70 may be a multi-hole device including a pintle and seat with a plurality of openings through which fuel passes, and the resulting fuel spray pattern 15 includes a plurality of radially projecting fuel plumes. In an embodiment wherein the fuel nozzle 70 includes a plurality of openings, the fuel spray pattern 15 formed during fuel injection includes a plurality of radially projecting fuel plumes that together form a generally conical shape in the combustion chamber 24 when viewed from a side view of the combustion chamber 24, wherein the conical shape has a spray angle that is preferably measured between major axes of ones of the spray plumes that are oriented 180° apart on the fuel nozzle 70, or as outer boundaries defining the spray angle. Each of the plurality of spray plumes may have a generally conical shape, a generally flat shape or another suitable shape that is primarily dependent upon the cross-sectional shape of the openings of the fuel nozzle 70.

Figures 1, 2:
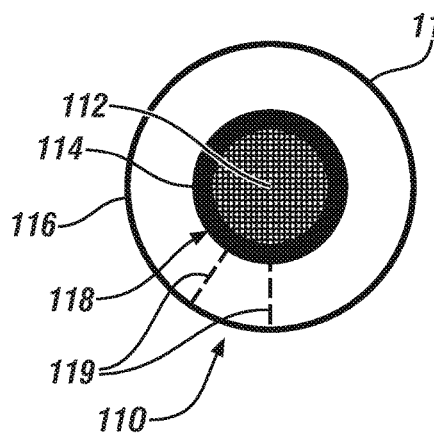
Figure 2:
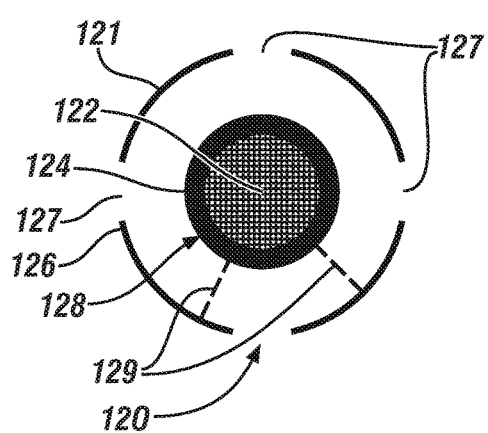

FIGS. 2-1 and 2-2 schematically show end-views of embodiments of the igniter 50 described with reference to FIG. 1. FIG. 2-1 schematically shows an end-view of one embodiment of a tip portion 111 of an igniter 110, which includes a generally circular cross-sectional shape with concentric elements including an anode 112, an annular dielectric barrier 114 formed around a periphery of the anode 112, and a continuous annular cathode 116. An annular gap 118 is formed between the dielectric barrier 114 and the cathode 116. The dielectric barrier 114 may be fabricated from alumina or another suitable insulating material. By way of a general description of operation of the igniter 110, the plasma ignition system 65 supplies an alternating electrical current to the igniter 110 during a short-term energy pulse, and the electrical current flows across the gap 118 forming multiple plasma streamers 119 between the anode 112 and the cathode 116. The streamers 119 interact with a proximal portion of an air-fuel charge in the combustion chamber causing ignition thereof. FIG. 2-2 schematically shows another embodiment of a tip portion 121 of an igniter 120, which includes a generally circular cross-sectional shape with concentric elements including an anode 122, an annular dielectric barrier 124 formed around a periphery of the anode 122, and a discontinuous annular cathode 126, with an annular gap 128 formed between the dielectric barrier 124 and the cathode 126. The discontinuous annular cathode 126 is a result of openings 127 formed in the periphery of the cathode 126 resulting in open areas that facilitate penetration of a fuel-air cylinder charge between the cathode 126 and the anode 122. The dielectric barrier 124 may be formed from, for example, alumina. In both embodiments, the short-term energy pulse is an electrical current applied to the anode 112, 122 that is supplied by the plasma ignition system 65. As described with reference to FIG. 2-1, during a short-term energy pulse, and the electrical current flows across the gap 128 forming multiple plasma streamers 129 between the anode 122 and the cathode 126. The streamers 129 interact with the air-fuel charge in the combustion chamber causing ignition thereof. In one non-limiting embodiment, the short-term energy pulse may have a peak primary voltage of 100 V, secondary voltages between 10 and 70 kV, a duration of 2.5 ms, and a total energy of 1.0 J. The short-term energy pulse is also referred to herein as a plasma energy pulse. The generally circular cross-sectional shape of the end of the igniters 110 and 120 is illustrative of one non-limiting embodiment. Other cross-sectional shapes, e.g., oval, rectangular, hexagonal, etc., may be employed. The igniter 50 as shown includes a configuration having a single anode 112 and cathode 116. Other configurations of dielectric barrier-discharge igniters, e.g., devices having multiple anodes, barriers and/or cathodes may be employed with similar effect. The specific details of the configuration of the igniter 50, its arrangement in the combustion chamber 24, and operating parameters (peak voltage, frequency and duration) associated with electric power and timing of activation are application-specific, and are preferably selected to achieve desired combustion characteristics within the combustion chamber 24.

Figure 3:
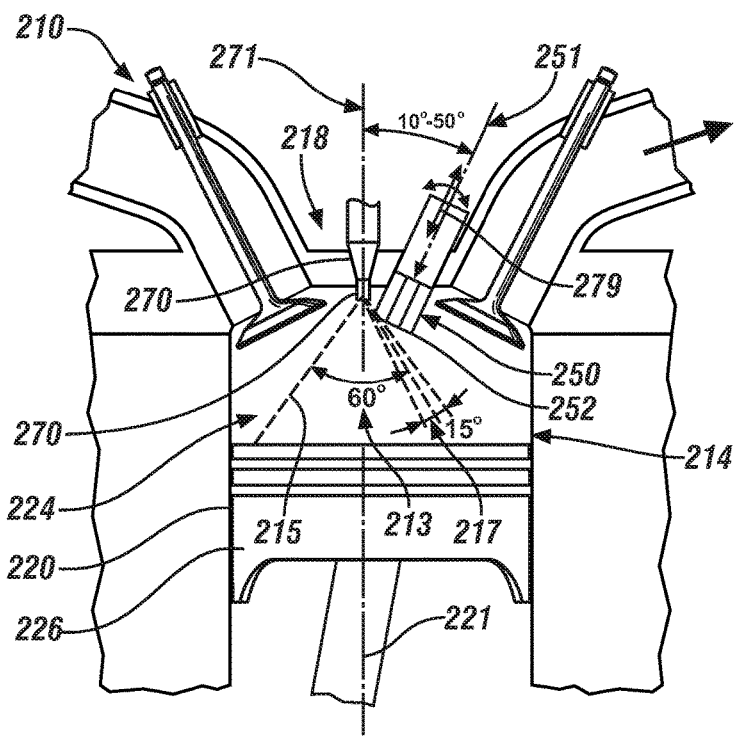
FIG. 3 schematically shows a cross-sectional view of an embodiment of the internal combustion engine including a variable-volume combustion chamber equipped with an igniter and a direct-injection fuel injector having a 60° spray angle, in accordance with the disclosure.

FIG. 3 schematically shows a cross-sectional view of an embodiment of the engine 210 described with reference to FIG. 1 including a variable-volume combustion chamber 224 disposed within, and including a cylinder 214 having a cylinder wall 220, a piston 226, and a cylinder head 218. The cylinder head 218 provides structure for mounting a fuel nozzle 270 configured to have a spray angle 213 of 60°, and the igniter 250. The fuel nozzle 270 is proximal to at tip portion 252 of the igniter 250 and both protrude into the combustion chamber 224. In one embodiment, the fuel nozzle 270 may be centrally located in the cylinder head 218, wherein the fuel nozzle 270 defines a first longitudinal axis 271 that arranged collinear with a longitudinal axis 221 of the cylinder 214 at a geometric center of a cross-section of the cylinder 214 and piston 226. Alternatively, the first longitudinal axis 271 defined by the fuel nozzle 270 may be otherwise situated when the cylinder head 218 and fuel nozzle 270 are arranged in a side fuel injection configuration. The igniter 250 defines a second longitudinal axis 251. The fuel nozzle 270 injects a fuel pulse into the combustion chamber 224 having a fuel spray pattern 215 that can be characterized as having a spray angle 213 and a plume cone angle 217. The spray angle 213 defines a total angle of exposure of the fuel spray pattern 215 in the combustion chamber 224, and the plume cone angle 217 defines an angle of fuel disbursement within a single fuel plume of the fuel spray pattern 215 when the fuel nozzle 270 is a multi-hole injector, or within a cross-section of the fuel plume of the fuel spray pattern 215 when the fuel nozzle 270 is a single hole injector. As shown, the spray angle 213 has a magnitude of 60° and the plume cone angle 217 has a magnitude of 15°. As shown, the second longitudinal axis 251 of the igniter 250 can be rotated within a range of 10° to 50° away from the first longitudinal axis 271 with an allowable variation of +/−10°. As shown, the tip portion 252 of the igniter 250 protrudes into the combustion chamber 224 at a distance 279, which can vary +/−15 mm along the second longitudinal axis 251.

Figure 4:
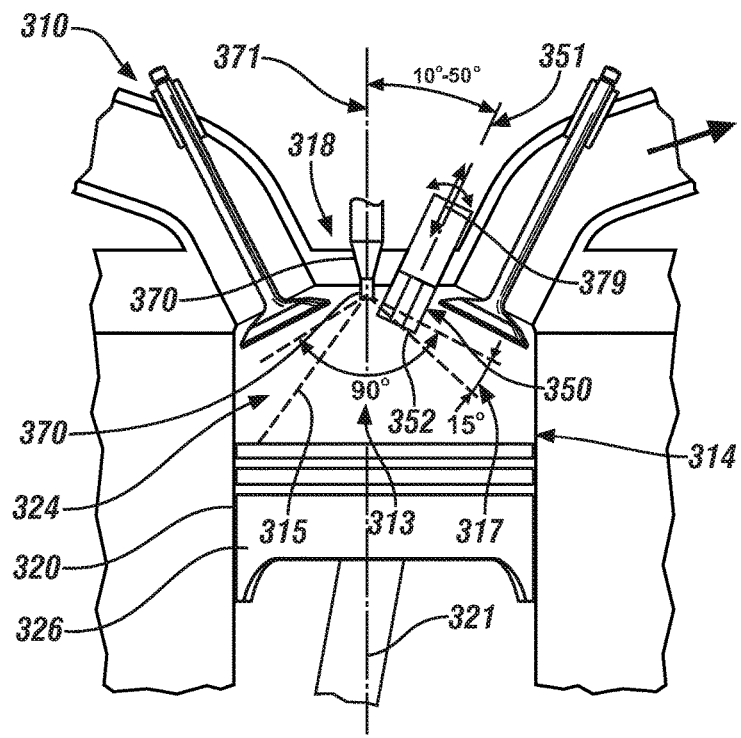
FIG. 4 schematically shows cross-sectional view of another embodiment of the internal combustion engine including a variable-volume combustion chamber equipped with an igniter and a direct-injection fuel injector having a 90° spray angle, in accordance with the disclosure.

FIG. 4 schematically shows a cross-sectional view of another embodiment of the engine 310 described with reference to FIG. 1 including a variable-volume combustion chamber 324 disposed within, and including a cylinder 314 having a cylinder wall 320, a piston 326, and a cylinder head 318. The cylinder head 318 provides a structure for mounting a fuel nozzle 370 and an igniter 350 with a fuel spray pattern 315 with a spray angle 313 having a magnitude of 90°. Both the fuel nozzle 370 and a tip portion 352 of the igniter 350 may protrude into the combustion chamber 324. The fuel nozzle 370 may be centrally located in the cylinder head 318, wherein the fuel nozzle 370 defines a first longitudinal axis 371 that is arranged collinear with a longitudinal axis 321 of the cylinder 314 at a geometric center of a cross-sectional area of the cylinder 314 and piston 326. The igniter 350 defines a second longitudinal axis 351. The fuel nozzle 370 injects a fuel pulse into the combustion chamber 324 having a fuel spray pattern 315 that can be characterized as having a spray angle 313 and a plume cone angle 317. The spray angle 313 defines a total angle of exposure of the fuel spray pattern 315 in the combustion chamber 324, and the plume cone angle 317 defines an angle of fuel disbursement within a single fuel plume of the fuel spray pattern 315 in a multi-hole injector, or within a cross-section of the fuel plume of the fuel spray pattern 315 in a single hole injector. As shown, the spray angle 313 has a magnitude of 90° and the plume cone angle 317 has a magnitude of 15°. As shown, the second longitudinal axis 351 of the igniter 350 may be rotated within a range between 10° to 50° away from the first longitudinal axis 371 with an allowable variation of ±10°. As shown, the tip portion 352 of the igniter 350 protrudes into the combustion chamber 324 at a distance 379, which can vary ±15 mm along the second longitudinal axis 351. When the fuel nozzle 370 has a spray angle of 90°, a smaller protrusion into the combustion chamber 324 (+/−5 mm) may be preferred.

The spray angle 313 can vary in consideration of fuel spray flashing or collapsing in direct-injected engine. The tip portion 352 of the igniter 350 is preferably located relative to the fuel nozzle 370 in a location that is insensitive to spray collapse. When the fuel nozzle 370 is centrally located in the cylinder head 318, the igniter 350 can be located between 10° to 50° of rotation from the first longitudinal axis 371 defined by the fuel nozzle 370, and the tip portion 352 of the igniter 350 may be located 5 mm to 20 mm away from the nozzle exit of the fuel nozzle 370. An igniter protrusion for any given spray angle is chosen such that one or more of the fuel plumes in the fuel spray pattern 315 contact the tip portion 352 of the igniter 350. The protrusion sensitivity at this layout may be within +/−1 mm for successful ignition in one embodiment. The igniter 350 may protrude 3 mm to 15 mm into the combustion chamber 324, depending on the spray angle 313. For a stratified charge combustion system, a multi-hole spray pattern with a nominal spray plume angle of 15° may be employed, and the tip portion 352 of the igniter 350 may protrude into the combustion chamber 324 at a distance 379 of 15 mm, with a nominal variation in angle of ±10° of rotation.

Figure 5:
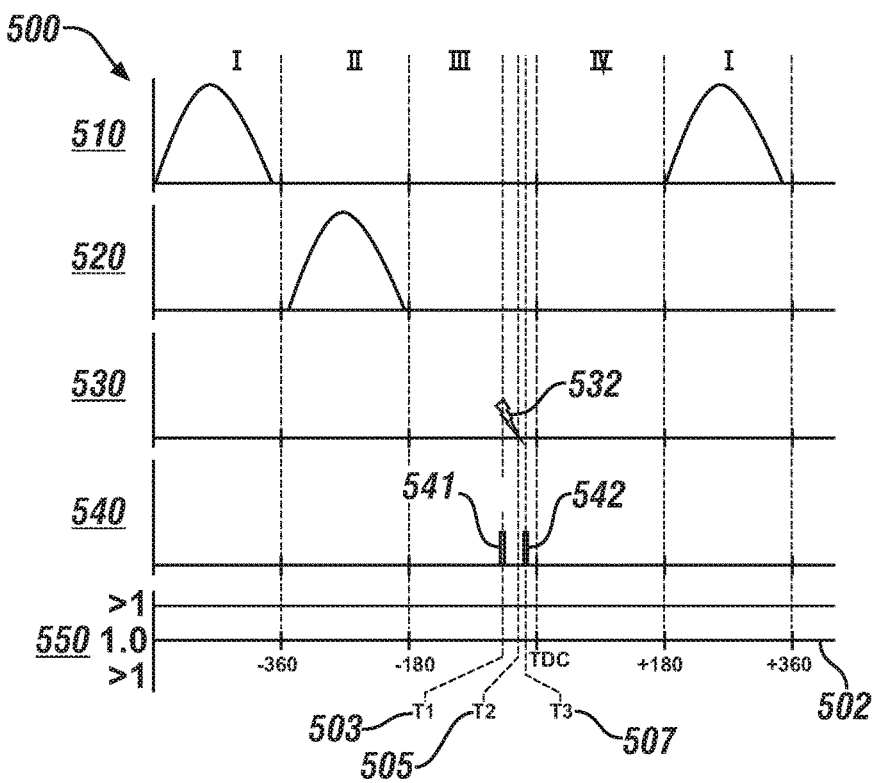
FIGS. 5 through 9 each graphically shows a timing graph including operating parameters associated with operation of an embodiment of an internal combustion engine employing an embodiment of an igniter proximal to a fuel injector, in accordance with the disclosure.

FIG. 5 graphically shows a timing graph 500 including operating parameters associated with operation of one cylinder during a single engine cycle of an embodiment of the engine 10 configured as described with reference to FIG. 1 including employing an embodiment of the igniter 50 proximal to the fuel injector 68 projecting into the combustion chamber 24. The combustion mode may be described as a spark-assisted compression ignition combustion mode. Graphed parameters include exhaust valve opening 510, intake valve opening 520, plasma energy pulse(s) 530, fuel injector pulses 540 and air/fuel ratio 550 in relation to engine crankshaft rotation, which is shown on the horizontal axis 502 over a single engine cycle of exhaust I, intake II, compression III and power IV strokes. A top-dead-center (TDC) time is shown. As shown, the engine is operating in an NVO mode at a lean ($\lambda$>1) air/fuel ratio. At time T1 503, a first fuel pulse 541 occurs. At time T2 505, a plasma energy pulse 532 is initiated, and immediately thereafter at time T3 507 a second fuel pulse 542 is initiated. The timings of T1 503, T2 505 and T3 507 are selected such that the first fuel pulse 541 at T1 503 interacts with the igniter 50. When the igniter 50 generates the plasma energy pulse 532, a radicalized environment is created proximal to the igniter 50 and the fuel from the second fuel pulse 542 at T3 507 interacts with one or more streamers on the igniter tip and combusts, generating combustion of the air-fuel mixture throughout the combustion chamber.

Figure 6:
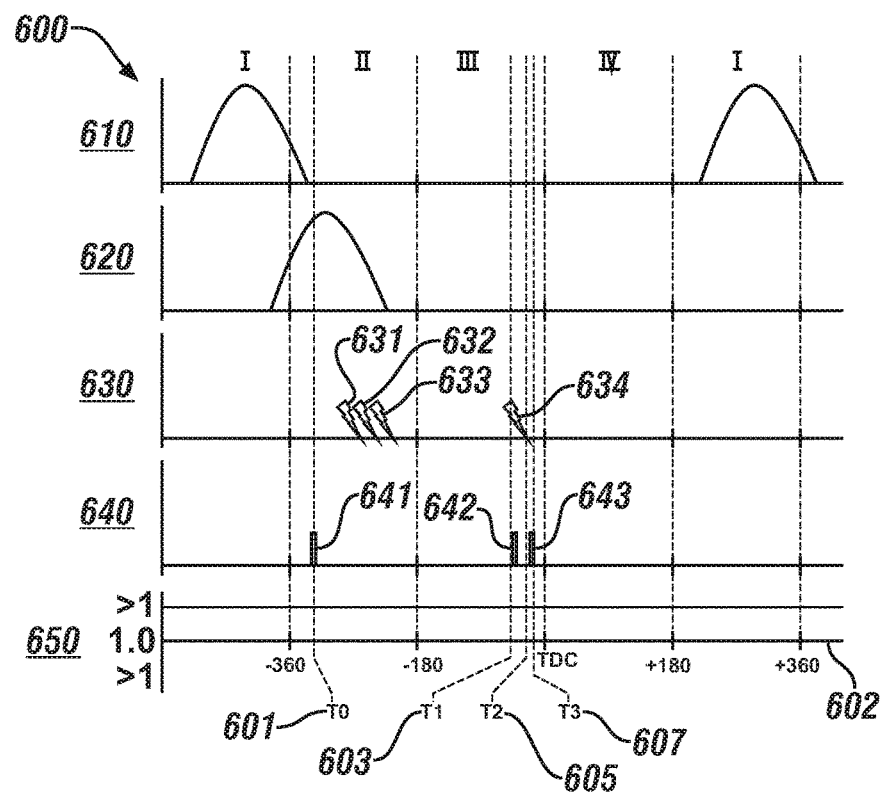

FIG. 6 graphically shows a timing graph 600 including operating parameters associated with operation of one cylinder during a single engine cycle of an embodiment of an the engine 10 configured as described with reference to FIG. 1 including employing an embodiment of the igniter 50 proximal to the fuel injector 68 projecting into the combustion chamber 24. The combustion mode may be described a spark-assisted compression ignition combustion mode. Graphed parameters include exhaust valve opening 610, intake valve opening 620, plasma energy pulse(s) 630, fuel injector pulses 640 and air/fuel ratio 650 in relation to engine crankshaft rotation, which is shown on the horizontal axis 602 over a single engine cycle of exhaust I, intake II, compression III and power IV strokes. A top-dead-center (TDC) time is shown. As shown, the engine is operating in a PVO mode at a lean ($\lambda$>1) air/fuel ratio. At time T0 601, an early fuel pulse 641 occurs, followed by a plurality of plasma energy pulses 631, 632, 633 to facilitate combustion. At time T1 603, a first fuel pulse 642 occurs. At time T2 605, another plasma energy pulse 634 is initiated, and immediately thereafter at time T3 607 a second fuel pulse 643 is initiated. The timings of T1 603, T2 605 and T3 607 are selected such that the fuel pulse 642 at T1 603 interacts with the igniter 50. When the igniter 50 generates the plasma energy pulse 634, a radicalized environment is created proximal to the igniter 50 and the fuel from the second fuel pulse 643 proximal thereto interacts with one or more streamers on the igniter tip and combusts, generating combustion of the air-fuel mixture throughout the combustion chamber.

Figure 7:
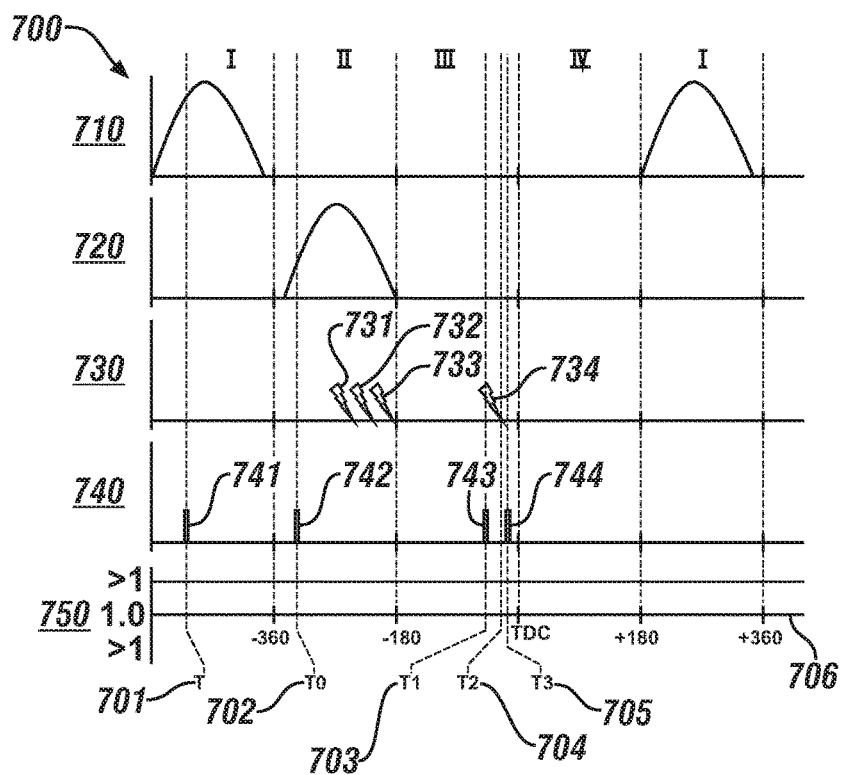

FIG. 7 graphically shows a timing graph 700 including operating parameters associated with operation of one cylinder during a single engine cycle of an embodiment of the engine 10 configured as described with reference to FIG. 1 including employing an embodiment of an igniter 50 proximal to the fuel injector 68 projecting into the combustion chamber 24. The combustion mode may be described as a spark-assisted compression ignition combustion mode. Graphed parameters include exhaust valve opening 710, intake valve opening 720, plasma energy pulse(s) 730, fuel injector pulses 740 and air/fuel ratio 750 in relation to engine crankshaft rotation, which is shown on the horizontal axis 706 over a single engine cycle of exhaust I, intake II, compression III and power IV strokes. A top-dead-center (TDC) time is shown. As shown, the engine is operating in an NVO mode at a lean ($\lambda>1$) air/fuel ratio. At time T 701, a first fuel pulse 741 occurs and at time T0 702, a second fuel pulse 742 occurs, followed by a plurality of plasma energy pulses 731, 732, 733 to generate radicals to facilitate combustion by generating ozone or other radicals that promote reactivity and combustion. At time T1 703, a third fuel pulse 743 occurs. At time T2 704, another plasma energy pulse 734 is initiated, and immediately thereafter at time T3 705 a fourth fuel pulse 744 is initiated. The timings of T1 703, T2 704 and T3 705 are selected such that the fuel pulse at T1 interacts with the igniter 50. When the igniter 50 generates the plasma energy pulse 734, a radicalized environment is created proximal to the igniter 50 and the fuel from the fuel pulses proximal thereto interacts with one or more streamers on the igniter tip and combusts, generating combustion of the air-fuel mixture throughout the combustion chamber.

Figure 8:
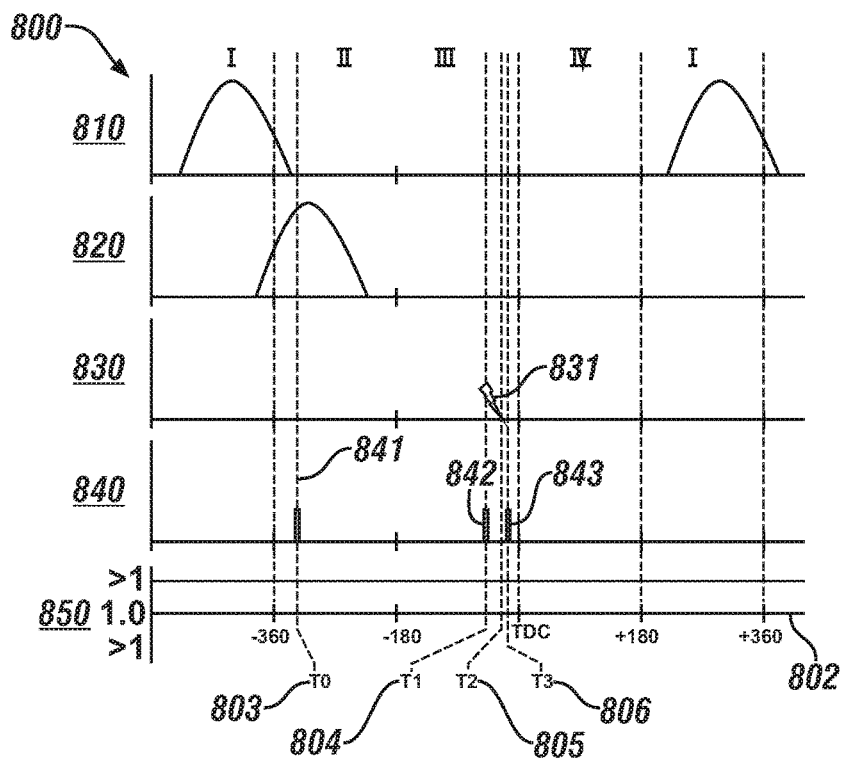

FIG. 8 graphically shows a timing graph 800 including operating parameters associated with operation of one cylinder during a single engine cycle of an embodiment of an engine configured as described with reference to FIG. 1 including employing an embodiment of an igniter 50 proximal to a fuel injector 68 projecting into the combustion chamber 24. The combustion is characterized as a lean or lean stratified combustion mode, or a spark-assisted compression ignition mode. Graphed parameters include exhaust valve opening 810, intake valve opening 820, plasma energy pulse(s) 830, fuel injector pulses 840 and air/fuel ratio 850 in relation to engine crankshaft rotation is shown on the horizontal axis 802 over a single engine cycle of exhaust I, intake II, compression III and power IV strokes. A top-dead-center (TDC) time is also shown. As shown, the engine is operating in a PVO mode at a lean ($\lambda>1$) air/fuel ratio. At time T0 803, an early fuel pulse 841 occurs. At time T1 804, a second fuel pulse 842 occurs. At time T2 805, a plasma energy pulse 831 is initiated, and immediately thereafter at time T3 806 a third fuel pulse 843 is initiated. The timings of T1 804, T2 805 and T3 806 are selected such that the fuel pulse at T1 804 interacts with the igniter 50. When the igniter 50 generates the plasma energy pulse 831 at time T2 805, the fuel from the second fuel pulse 842 proximal thereto interacts with one or more streamers on the igniter tip and combusts, generating combustion of the air-fuel mixture throughout the combustion chamber.

Figure 9:
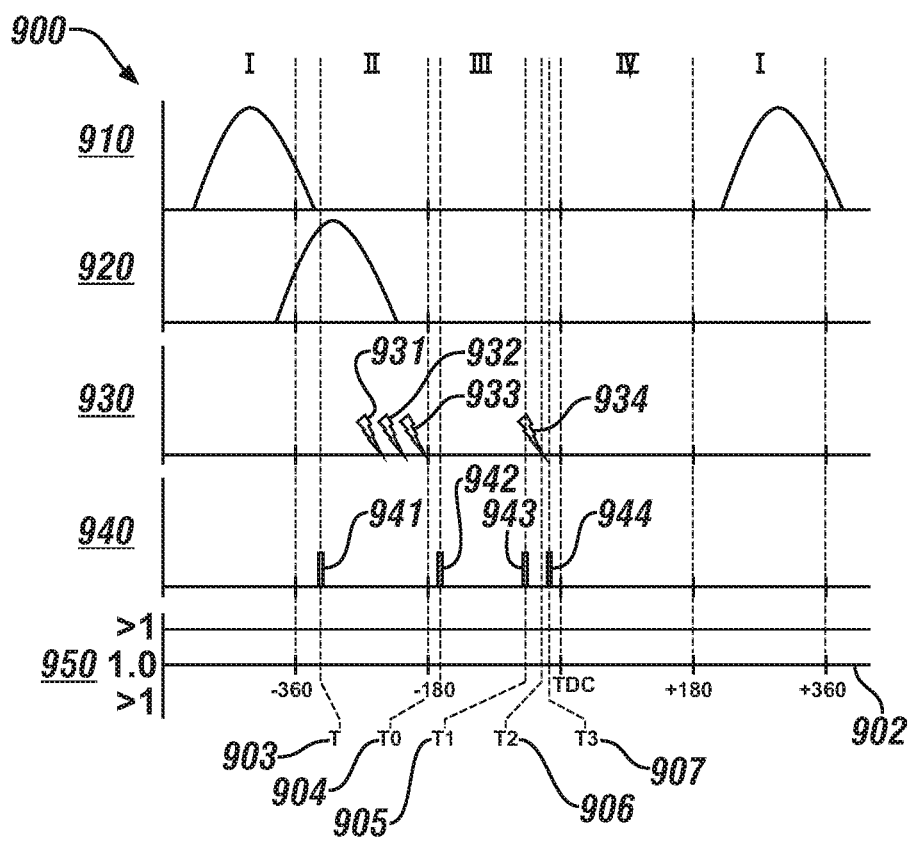

FIG. 9 graphically shows a timing graph 900 including operating parameters associated with operation of one cylinder during a single engine cycle of an embodiment of an engine configured as described with reference to FIG. 1 including employing an embodiment of an igniter 50 proximal to a fuel injector 68 projecting into the combustion chamber 24. The combustion is characterized as a lean or lean stratified combustion mode, or a spark-assisted compression ignition mode. Graphed parameters include exhaust valve opening 910, intake valve opening 920, plasma discharge event(s) 930, fuel injector pulses 940 and air/fuel ratio 950 in relation to engine crankshaft rotation is shown on the horizontal axis 902 over a single engine cycle of exhaust I, intake II, compression III and power IV strokes. A top-dead-center (TDC) time is shown. As shown, the engine is operating in a PVO mode at a lean ($\lambda>1$) air/fuel ratio. At time T 903, a first fuel pulse 941 occurs, following by a plurality of plasma energy pulses 931, 932, 933. At time T0 904, a second fuel pulse 942 occurs. At time T1 905, a third fuel pulse 943 occurs and at time T2 906, a plasma energy pulse 934 is initiated, and immediately thereafter at time T3 907 a fourth fuel pulse 944 is initiated. The timings of T1 905, T2 906 and T3 907 are selected such that the third fuel pulse 943 at T1 905 interacts with the igniter 50. When the igniter 50 initiates the plasma energy pulse 934 at time T2 906, a radicalized environment is created proximal to the igniter 50 and the fuel from the second fuel pulse 942 and the third fuel pulse 943 interacts with one or more streamers on the igniter tip and combusts, generating combustion of the air-fuel mixture throughout the combustion chamber.

Embodiments of the plasma ignition system including a barrier-discharge igniter configured as described with reference to FIG. 1 may facilitate stable low-temperature combustion at highly dilute operating conditions when combined with a multiple fuel injection strategy, and thus provide an alternative to a spark plug ignition system that can enhance low-temperature, dilute combustion at high combustion pressures while achieving robust lean low-temperature combustion.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:
1. An internal combustion engine system, comprising:
   an internal combustion engine, including:
      a plasma ignition system including a barrier-discharge igniter having a tip portion protruding into a combustion chamber of the internal combustion engine, wherein the tip portion of the igniter comprises an anode, an annular dielectric barrier formed around a periphery of the anode, and a discontinuous annular cathode, wherein an annular gap is formed between the dielectric barrier and the cathode, and
      a fuel injection system including a direct-injection fuel injector including a fuel nozzle protruding into the combustion chamber proximal to the tip port of the igniter; and
   a controller operatively connected to the internal combustion engine, the plasma ignition system and the fuel injection system, the controller including executable code operative to:
      control the internal combustion engine to operate at an air/fuel ratio that is lean of stoichiometry,
      control the internal combustion engine in a negative valve overlap mode,
      control the fuel injector to inject a first fuel pulse prior to activation of the igniter during each engine cycle,
      control the igniter to initiate a plasma energy pulse, and
      control the fuel injector to inject a second fuel pulse during the plasma energy pulse.

2. The internal combustion engine of claim 1, wherein the direct-injection fuel injector mounted on the cylinder head and protruding into the combustion chamber proximal to the igniter further comprises:
  the fuel injector centrally located in the cylinder head, wherein the fuel injector has a first longitudinal axis; and
  the igniter having a second longitudinal axis;
  wherein the second longitudinal axis is located between 10° to 50° of rotation from the first longitudinal axis; and
  wherein the tip portion of the igniter is located away from the fuel nozzle at a linear distance that is between 5 mm and 20 mm.

3. The internal combustion engine of claim 1, wherein the fuel nozzle comprises a single hole device including a single opening into the combustion chamber; and wherein a fuel spray pattern from the fuel nozzle is a single plume having a conical shape, and wherein the single plume contacts the tip portion of the igniter during the plasma energy pulse.

4. The internal combustion engine of claim 1, wherein the fuel nozzle comprises a multi-hole device including a plurality of openings into the combustion chamber; and wherein a fuel spray pattern from the fuel nozzle includes a plurality of radially projecting plumes, and wherein one of the plumes contacts the tip portion of the igniter during the plasma energy pulse.

5. The internal combustion engine of claim 1, wherein the controller including executable code operative to control the internal combustion engine at an air/fuel ratio that is lean of stoichiometry further comprises the controller including executable code operative to control the internal combustion engine in a spark-assisted compression-ignition mode with the negative valve overlap.

6. The internal combustion engine of claim 1, wherein the controller including executable code operative to control the internal combustion engine at an air/fuel ratio that is lean of stoichiometry further comprises the controller including executable code operative to control the internal combustion engine in a compression-ignition mode.

7. A plasma ignition system for an internal combustion engine, comprising:
  a barrier-discharge igniter having a tip portion protruding into a combustion chamber of the internal combustion engine, wherein the tip portion is proximal to a fuel nozzle of a direct-injection fuel injector protruding into the combustion chamber, and wherein the tip portion of the igniter comprises an anode, an annular dielectric barrier formed around a periphery of the anode, and a discontinuous annular cathode, wherein an annular gap is formed between the dielectric barrier and the cathode; and
  a controller operatively connected to the plasma ignition system, the controller including executable code operative to control the internal combustion engine to operate at an air/fuel ratio that is lean of stoichiometry, control the igniter to initiate a plasma energy pulse in the combustion chamber subsequent to an activation of the direct-injection fuel injector to inject a first fuel pulse into the combustion chamber during engine operation in a negative valve overlap mode;
  wherein the direct-injection fuel injector is operable to inject a second fuel pulse into the combustion chamber during the plasma energy pulse.

8. The plasma ignition system of claim 7, wherein the fuel injector has a first longitudinal axis and the igniter has a second longitudinal axis wherein the second longitudinal axis is located between 10° and 50° of rotation from the first longitudinal axis.

9. The plasma ignition system of claim 7, wherein the tip portion of the igniter is located at a linear distance that is between 5 mm and 20 mm away from the fuel nozzle.

10. The plasma ignition system of claim 7, wherein the tip portion of the igniter is contacted by a fuel plume of a fuel spray pattern from the direct-injection fuel injector.

11. A method for controlling an internal combustion engine including a plasma ignition system, including a barrier-discharge igniter having a tip portion protruding into a combustion chamber, wherein the tip portion of the igniter comprises an anode, an annular dielectric barrier formed around a periphery of the anode, and a discontinuous annular cathode, wherein an annular gap is formed between the dielectric barrier and the cathode, and a fuel injection system including a direct-injection fuel injector including a fuel nozzle protruding into the combustion chamber, wherein the fuel nozzle is proximal to the igniter, the method comprising:
  controlling the internal combustion engine to operate at an air/fuel ratio that is lean of stoichiometry and in a negative valve overlap mode;
  controlling the fuel injector to inject a first fuel pulse prior to activation of the igniter;
  controlling the igniter to initiate a plasma energy pulse; and
  controlling the fuel injector to inject a second fuel pulse during the plasma energy pulse.

\* \* \* \* \*